United States Patent [19]

Grimm et al.

[11] 4,258,074
[45] Mar. 24, 1981

[54] PROCESS FOR THE ENCRUSTING, PILLING OR GRANULATING OF SEED MATERIAL

[75] Inventors: Hans Grimm, Meinhard; Ralf Dabrowski, Hilden, both of Fed. Rep. of Germany

[73] Assignee: Saat-und Erntetechnik GmbH, Eschwege, Fed. Rep. of Germany

[21] Appl. No.: 954,617

[22] Filed: Oct. 25, 1978

[51] Int. Cl.³ .............................................. A01G 5/06
[52] U.S. Cl. .......................................... 427/4; 47/57.6; 47/DIG. 9; 106/DIG. 3; 252/378 R; 427/212; 428/403
[58] Field of Search ..................... 427/4, 212; 428/403; 252/378; 106/DIG. 3; 47/57.6, DIG. 9

[56] References Cited

U.S. PATENT DOCUMENTS

| | | | |
|---|---|---|---|
| 2,579,734 | 12/1951 | Burgesser | 47/57.6 |
| 2,693,018 | 11/1954 | Czarnecki | 252/378 R |
| 3,690,034 | 9/1972 | Knapp | 47/57.6 |
| 3,871,132 | 3/1975 | Brink | 47/57.6 |

OTHER PUBLICATIONS

Perry, J. H., *Chemical Engineer's Handbook*, N.Y., McGraw-Hill, 1963, pp. 21-51, (4th edition).

*Primary Examiner*—Ronald H. Smith
*Assistant Examiner*—Janyce A. Bell
*Attorney, Agent, or Firm*—Scully, Scott, Murphy & Presser

[57] ABSTRACT

A process for the gas and liquid-permeable encrusting, pilling and granulating of seed material with the utilization of a three-layer mineral as a laminar coating material which is expandable under the effect of a liquid; the three-layer mineral being constituted of vermiculite or hydrous mica to form the basic material and providing a fine-grained reversibly expandable coating material when applied onto the seed, and which rapidly absorbs and gives off polar liquids such as water. The basic material consists of particles in the form of extremely thin, uniformly even platelets which comprise over 50% of the basic material.

5 Claims, No Drawings

PROCESS FOR THE ENCRUSTING, PILLING OR GRANULATING OF SEED MATERIAL

BACKGROUND OF THE INVENTION

1. Field of the Invention

The present invention relates to a process for the encrusting, pilling and granulating of seed material.

It is known in agriculture, forestry, horticulture, as well as in ornamental planting that there can be employed seed material which is encrusted, pilled or granulated.

The definition of the terminology relating to the encrusting, pilling and granulating of seed material as is presently understood in the art is described in German Pat. No. 21 35 410. For this purpose there are utilized inorganic fillers, such as kaolin, bentonite, powdered stone, organic fillers such as peat, wood flour, straw flour, and water, or aqueous salt solutions containing water-soluble plant nutrients.

2. Discussion of the Prior Art

German Laid-Open Patent Specification No. 19 15 942 relates to an encapsulated seed grain, whose seedling grains are coated with predetermined additives. Proposed therein are unexpandable, brittle materials as the "outer shell composition". This more recent proposal has also taken another path. In essence, it utilizes no materials in the outer shell compound having any extensive plasticity and permeability to gases and liquids. Contrastingly, the permeability is adapted to be attained by means of rupturing of the brittle shell after internal expansion.

This process has not rendered obvious the novel utilization of a reversibly expandable three-layer mineral having a large crystalline surface with mutually detached crystal layers.

The Laid-Open German Patent Specification No. 22 10 330 proposes the formation of "enveloping-seedling cells" through the compression of a compound into tablets. The "cell" should be constituted of two outer layers of a particulate material of large particle size, and a central pillowing layer, referred to as the impact layer, and having a smaller particle size. The material forming the outer layers, preferably, should be constituted of vermiculite, which evidences a laminar particle configuration and which is admixed with significant quantities of non-laminar particulate organic materials so as to prevent a layering of the vermiculite during pressing. These "outer layers" should be constituted of an admixture of peat moss, wood cellulose, vermiculite, inorganic nutrients, an adhesive and a lubricant. The vermiculite should rapidly expand within the tablet "when the tablet is immersed in water, so as to achieve capillary passages through which the water will flow to the seedling from the ground, and which will rapidly soften in order to be easily penetrated by the seedling when the latter germinates". These disclosures verify that this known process employs vermiculite as an expansion agent.

The process pursuant to the present invention has improved upon this state of the art. Thus, the process utilizes vermiculite as the basic material to produce a fine-grained, reversibly expandable coating material possessing special properties which, alone or in conjunction with other materials, is used in the treatment of the seedling grains.

SUMMARY OF THE INVENTION

Accordingly, it is an object of the present invention to treat all varieties of seed material having all kinds of surfaces with an enveloping material provided through encrusting, pilling or granulating, the material having a strong "adhesability" and evidencing a high permeability for gases and liquids and thereby provides all types of seed materials with uniformly good growth conditions under different biological conditions.

The process according to the present invention contemplates that for the gas and liquid-permeable encrusting, pilling and granulating of seed material with the utilization of a three-layer mineral as a laminar coating material which is expandable under the effect of a liquid; the improvement comprising the three-layer mineral being vermiculite or hydrous mica as the basic material providing a fine-grained reversibly expandable coating material when applied onto the seed, and which rapidly absorbs and gives off polar liquids such as water. The basic material consists of particles in the form of extremely thin, uniformly even platelets which comprise over 50% of the basic material. The particles have a thickness of 0.5 to 10 microns and surface dimensions corresponding to an equivalent diameter of 10 to 200 microns, and a particle thickness: equivalent diameter ratio equal to or less than 1:10. The particles possess hydrophilic properties at their planar surfaces and, upon being dried from an aqueous mass form a cohesive and adhesive coating and wherein the three-layer mineral is present in the range of 35 to 65% by weight of the dried basic material relative to the total weight of the moist material. At thickness of up to 5 mm, the laminar coating material evidences a substantial plasticity and a permeability to gases and liquids.

The invention further contemplates a process in which the even or planar platelets of the three-layer mineral constitutes over 75% of the total surface area. Furthermore, the treated seed material is dried rapidly.

A preferred process for producing the laminar coating material containing the three-layer mineral, vermiculite or hydrous mica, consists of expanding the laminar coating material by means of polar liquids, such as water, and by structure-protective mechanical fragmentation converts the coating material into extremely thin, uniformly even platelet-shaped particles.

However, it is also possible to contemplate the provision of other processes for the production of this new laminar coating material. In a preferred embodiment, this new material is employed in an expanded form.

Although vermiculite as well as hydrous mica are utilized as the principal components of the laminar coating material, the material may also include other additives or fillers such as kaolin.

Vermiculite belongs to the mica-like clay minerals which possess an expandable crystal matrix and whose crystals are laminarly constructed. It is similar to the Montmorin-saponite minerals group.

The mineral belongs to the three-layer silicates and has water stored intermediate the so-called layer strata. Due to its not rigidly interconnected layer strata, the vermiculite possesses an inner crystalline expansive capacity. Associated therewith is the ability that the vermiculite crystals during rapid heating will expand in one direction up to about 30 times their original thickness. Reference to this recognition of the structure and the properties of vermiculite may be had in the following literature sources:

Hugo Strunz, Mineralogische Tabellen, 5th Edition, Leipzig 1970, Akademische Verlagsgesellschaft, Geest & Portig KG, Page 447.

Pursuant to Römpps Chemie-Lexidon, Frankh'sche Verlagshandlung, Stuttgart, 7th Edition, 1977, No. 3000, in the ideal case vermiculite evidences an approximate composition having the following formula:

$$Mg_3(Al,Si)_4O_{10}(OH)_2 \cdot (H_2O)_4.$$

Vermiculite additionally contains significant amounts of bound iron (Fe).

This expansive property is also evidenced by "hydrous mica" as well as by "mixed-layer minerals". With regard to the last-mentioned minerals, there are also to be understood those in which, for instance, vermiculite layers crystallize with mica layers in an alternating random sequence.

The definition of the hydrous mica mineral product material is obtained from Salmang-Scholze in "Die physikalischen und chemischen Grundlagen der Keramik", Springer Verlag, New York 1968.

The new material produced in accordance with the process of the invention has been deposited in the German Patent Office.

The inventive process is now described hereinbelow in detail with reference to the following examples:

EXAMPLE 1

Corn seeds having a thousand-grain weight of 350 g, in an amount of 100 kg, together with a composition consisting of 5 kg kaolin; 2 kg of a mineral material according to the invention, that has been subjected to bubbling, expansion and structure-protective fragmentation, by means of wet grinding to form platelet-like particles in the mineral material of over 50% by weight, possessing extremely thin uniformly even platelet-like particles having a thickness of about 0.5 to 10 microns and surface dimensions corresponding to an equivalent diameter of 20 microns with a particle thickness: equivalent diameter ratio of about 1:10 to 1:40; 2 kg of a known plant protective agent (fungicide, insecticide); and 10 kg water are encrusted in a rotating vessel at room temperature for about 10 min., and thereafter dried with heated air at 40° C. for a short period of about 30 minutes without the formation of shrinkage fissures. These measures for the effecting of the drying without the formation of shrinkage fissures are also valid for other seedling shells, particularly those having smooth surfaces with which, pursuant to the process of the invention, there is produced a good adherence of the coatings to the seeds.

EXAMPLE 2

Sugar beet seeds having a thousand-grain weight of 11 g, in an amount of 100 kg; together with 12 kg mineral material formed pursuant to the invention as in Example 1; as well as 1.5 kg of a plant protection agent (fungicide, insecticide); 0.5 kg inorganic coloring pigment such as red iron oxide; and 20 kg water are pilled in a coating vessel at room temperature for about 30 minutes, and thereafter dried with heated air at 50° C. for a short time period of one hour without the formation of shrinkage fissures.

EXAMPLE 3

Agrostis spez. seeds, in an amount of 10 kg; with 25 kg mineral material produced according to the invention and based on hydrous mica as in Example 1, however, with platelet-like particles being in the material in an amount of over 60% by weight, the extremely thin, uniformly even platelet-like particles having a thickness of 1 to 5 micron and with surface dimensions corresponding to a median equivalent diameter of 40 microns and with a particle thickness: equivalent diameter ratio of about 1:10 to 1:20, as well as 25% water calculated based on the amount of the mineral material, are granulated in a granulating cylinder having outlet apertures, and thereafter dried with air at 30° C. for about 3 hours without the formation of shrinkage fissures.

These measures taken for the drying without the formation of shrinkage fissures are also valid for other seedling shells, preferably those with smooth surfaces wherein, according to the inventive process, there is attained a rigid adherence of the layers of the total compound to the seed material.

The inventive process employing the mineral material pursuant to the invention affords the technical advantage of shortened application periods at more rapid and uniform distribution of the treating composition about the seedling grains. This advantage is also especially present for seed grains which possess a nonuniformly roughened or smooth surface.

The treated seed material, according to the process of the invention, is advantageously completely and uniformly encapsulated during the encrusting and pilling.

The inventive process further affords the advantage of the rapid granulation in contrast with the processing pursuant to the present state of the art. By means of the granulated composition in conformance with the composition of the inventive process of the invention, achieved are lengthy service lives for the apertures of the granulating cylinder while protecting the seed material against mechanical damage.

The seed material which is treated in conformance with the process of the invention, will in a short period absorb the spring water which is necessary for germination, and thereby leads to a uniform and rapid germination.

Furthermore, the seed material according to the inventive process will, subsequent to the treatment and drying, afford the advantage of a uniform sprinkling capability during output with a spreader or sowing machine.

What is claimed is:

1. In a process for the gas and liquid-permeable encrusting, pilling or granulating of seed material through the use of a laminar material comprising a three-layer mineral which is expandable under the effect of a liquid, the improvement comprising: encrusting, pilling or granulating seed material with a three-layer mineral comprising a basic material which is a fine-grained reversibly expandable material adapted to rapidly absorb or give off polar liquids, such as water, said basic material including lamellar particles in the form of extremely thin, uniformly even platelets comprising over 50% of said material by weight, having a thickness of from 0.5 to 10 microns and surface dimensions corresponding to an equivalent diameter of 10 to 200 microns and a particle thickness: equivalent diameter ratio equal to or less than 1:10, said particles possessing hydrophilic properties at their planar surfaces; and forming extensively cohesive and adhesive coatings when dried out of an aqueous mass, said three-layer mineral having a dry mass of 35 to 65% by weight relative to the total weight of the moist mass so as to evidence a substantial plasticity with a permeability to gases and liquids at a coating thickness of up to about 5 mm, said basic material being obtained by the expansion of a three-layer mineral selected from the group consisting of vermiculite or hydrous mica with a polar liquid followed by structure-protective mechanical fragmentation of the expanded mineral to provide a mineral of the aforestated characteristics.

2. Process as claimed in claim 1, said even platelets of the three-layer mineral constituting over 75% of the total surface area of said material.

3. Process as claimed in claim 1 or 2, comprising rapidly drying said treated seed material.

4. Process as claimed in claim 1, said vermiculite and mica being crystallized in layers in an alternating random sequence.

5. A laminar material for the gas and liquid-permeable encrusting, pilling or granulating of seed material, said laminar material comprising a three-layer mineral which is expandable under the effect of a liquid, said three-layer mineral comprising a basic material which is a fine-grained reversibly expandable material adapted to rapidly absorb or give off polar liquids, such as water, said basic material including lamellar particles in the form of extremely thin, uniformly even platelets comprising over 50% by weight of said material, having a thickness of from 0.5 to 10 microns and surface dimensions corresponding to an equivalent diameter of 10 to 200 microns and a particle thickness equivalent diameter ratio equal to or less than 1:10, said particles possessing hydrophilic properties at their planar surfaces; and forming extensively cohesive and adhesive coatings when dried out of an aqueous mass, said three-layer mineral having a dry mass of 35 to 65% by weight relative to the total weight of the moist mass so as to evidence a substantial plasticity with a permeability to gases and liquids at a coating thickness of up to about 5 mm, said basic material being obtained by the expansion of a three-layer mineral selected from the group consisting of vermiculite or hydrous mica with a polar liquid followed by structure-protective mechanical fragmentation of the expanded mineral to provide a mineral of the aforestated characteristics.

* * * * *